(12) United States Patent
Liu (10) Patent No.: US 11,614,120 B2
(45) Date of Patent: Mar. 28, 2023

(54) LOCKING MECHANISM AND VEHICLE HAVING SAME

(71) Applicant: NINEBOT (BEIJING) TECH CO., LTD., Beijing (CN)

(72) Inventor: Zhanqi Liu, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 113 days.

(21) Appl. No.: 17/228,827

(22) Filed: Apr. 13, 2021

(65) Prior Publication Data

US 2021/0324887 A1 Oct. 21, 2021

(30) Foreign Application Priority Data

Apr. 17, 2020 (CN) .......................... 202020578675.5

(51) Int. Cl.
*F16C 11/10* (2006.01)
*B62K 15/00* (2006.01)

(52) U.S. Cl.
CPC .......... *F16C 11/103* (2013.01); *B62K 15/006* (2013.01); *Y10T 403/32459* (2015.01)

(58) Field of Classification Search
CPC .... B62K 15/006; B62K 15/008; B62K 21/22; B62K 21/24; F16B 7/02; F16B 7/025; F16C 11/10; F16C 11/103; Y10T 403/32262; Y10T 403/32286; Y10T 403/32295; Y10T 403/32303; Y10T 403/32327; Y10T 403/32336; Y10T 403/32344; Y10T 403/32368; Y10T 403/32418; Y10T 403/32442; Y10T 403/32451; Y10T 403/32459; Y10T 403/7066; Y10T 403/7067

USPC ...... 403/84, 87, 88, 89, 92, 93, 94, 97, 103, 403/106, 107, 108, 374.2, 374.3
See application file for complete search history.

(56) References Cited

U.S. PATENT DOCUMENTS 1,620,588 A 3/1927 Wilson
2,576,866 A 11/1951 Verderber
2,921,773 A * 1/1960 Hoelzer ................... B65G 7/12
403/103

(Continued)

FOREIGN PATENT DOCUMENTS

CN 210310716 U 4/2020

OTHER PUBLICATIONS

Search Report for EP application 21168299.2.

*Primary Examiner* — Josh Skroupa
(74) *Attorney, Agent, or Firm* — Timothy W. Menasco, Esq.; Harter Secrest & Emery LLP (57) ABSTRACT

A locking mechanism includes: a mounting housing; a shaft sleeve rotatably arranged on the mounting housing and having an inner wall provided with a first snap structure; a locking assembly, at least a part of the locking assembly being movably arranged in the shaft sleeve, and the locking assembly being provided with a second snap structure cooperating with the first snap structure; and a driving member, at least a part of the driving member being movably arranged on and passing through the mounting housing, wherein the driving member is in driving connection with at least a part of the locking assembly, and the driving member drives the second snap structure to be snapped with or separated from the first snap structure.

18 Claims, 4 Drawing Sheets

(56) References Cited

U.S. PATENT DOCUMENTS

| | | | | |
|---|---|---|---|---|
| 3,129,937 | A | * | 4/1964 | Miller .................... B23Q 1/522 403/103 |
| 5,244,301 | A | * | 9/1993 | Kurke ....................... B62J 1/08 403/97 |
| 5,515,744 | A | * | 5/1996 | Liao ........................ B62K 21/16 403/97 |
| 6,662,815 | B2 | * | 12/2003 | Tung ...................... A45B 17/00 403/84 |
| 8,746,417 | B2 | | 6/2014 | Triebold |
| 9,267,537 | B2 | * | 2/2016 | Plomteux .............. F16C 11/103 |
| 2020/0003253 | A1 | * | 1/2020 | Ng ........................ F16C 11/103 |
| 2020/0008990 | A1 | | 1/2020 | Harrison |
| 2022/0120420 | A1 | * | 4/2022 | Oláh ..................... F16C 11/103 |

\* cited by examiner

LOCKING MECHANISM AND VEHICLE HAVING SAME

CROSS-REFERENCE TO RELATED APPLICATION

This application is based on and claims priority to Chinese Application No. 202020578675.5, filed on Apr. 17, 2020, the entire contents of which are incorporated herein by reference.

FIELD

The present disclosure relates to the technical field of locking mechanisms, and more particularly, to a locking mechanism and a vehicle having the same.

BACKGROUND

At present, in order to ensure the stability of scooters in operation, rotary folding structures of the scooters in the related art are generally locked in place by thread preload force.

However, this locking form has the problems of a large number of rotation turns, easy disengagement of knobs, and large preload force required. Since a user's hand-tightening preload force generally cannot reach 17 KN, it is necessary to use a special tool for locking operation, which is not convenient for the user to operate. Meanwhile, when friction is insufficient, it will cause looseness during lateral vibration and result in failure of the locking mechanism, which may cause personal injury to the user in serious cases.

SUMMARY

Embodiments of one aspect of the present disclosure provides a locking mechanism. The locking mechanism includes: a mounting housing; a shaft sleeve rotatably arranged on the mounting housing, an inner wall of the shaft sleeve being provided with a first snap structure; a locking assembly, at least a part of the locking assembly being movably arranged in the shaft sleeve, and the locking assembly having a second snap structure configured to cooperate with the first snap structure; and a driving member, at least a part of the driving member being movably arranged on and passing through the mounting housing, the driving member being in driving connection with at least a part of the locking assembly, and the driving member configured to drive the second snap structure to be snapped with or separated from the first snap structure.

Embodiments of another aspect of the present disclosure provides a vehicle, and the vehicle includes a locking mechanism. The locking mechanism includes: a mounting housing; a shaft sleeve rotatably arranged on the mounting housing, an inner wall of the shaft sleeve being provided with a first snap structure; a locking assembly, at least a part of the locking assembly being movably arranged in the shaft sleeve, and the locking assembly having a locking position where a second snap structure of the locking assembly is snapped with the first snap structure and an avoiding position where the second snap structure is separated from the first snap structure; and a driving member, at least a part of the driving member being movably arranged on and passing through the mounting housing, the driving member being in driving connection with at least a part of the locking assembly, and the driving member configured to drive the second snap structure to be snapped with or separated from the first snap structure

BRIEF DESCRIPTION OF THE DRAWINGS

The drawings, which constitute a part of the present disclosure, are used to provide further understanding of the present disclosure. The illustrative embodiments of the present disclosure and the descriptions thereof are used to explain the present disclosure, and do not constitute improper limitation on the present disclosure. In the drawings.

DETAILED DESCRIPTION

It should be noted that embodiments and features in the embodiments of the present disclosure may be combined with one another in the case of no conflict. The present disclosure will be described in detail below with reference to the drawings and in conjunction with the embodiments.

Figure 1:
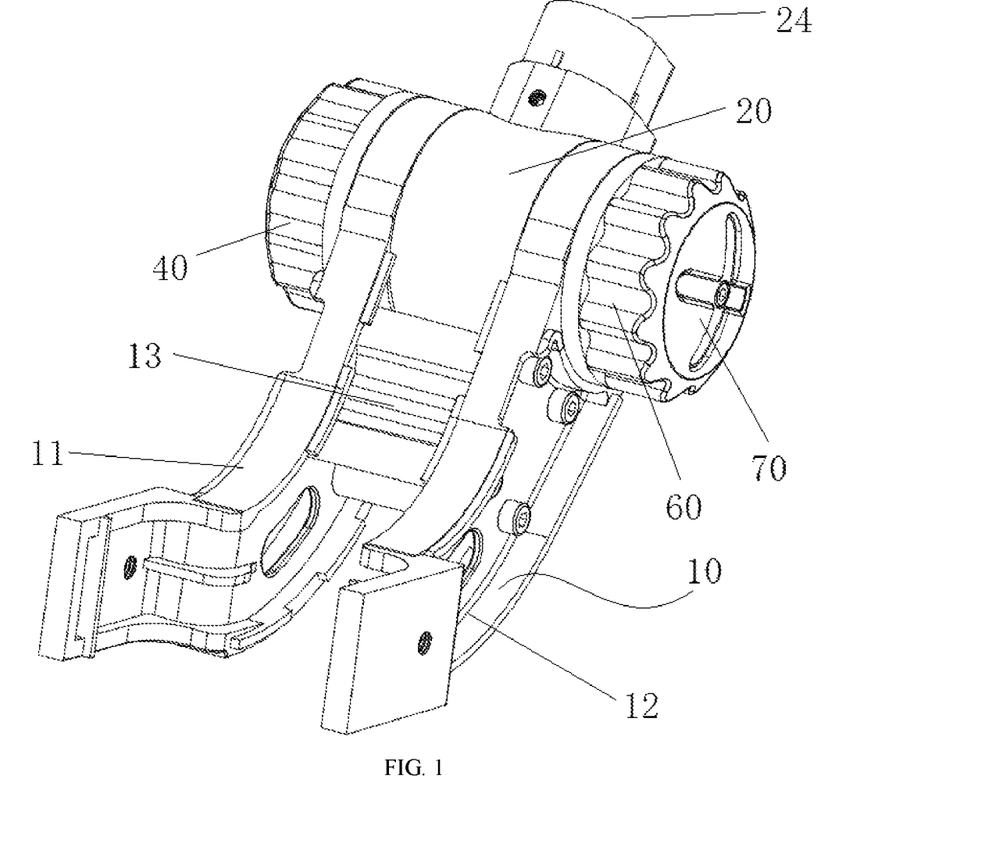
FIG. 1 is a schematic view illustrating a structure of a locking mechanism according to a first embodiment of the present disclosure.
Figure 2:
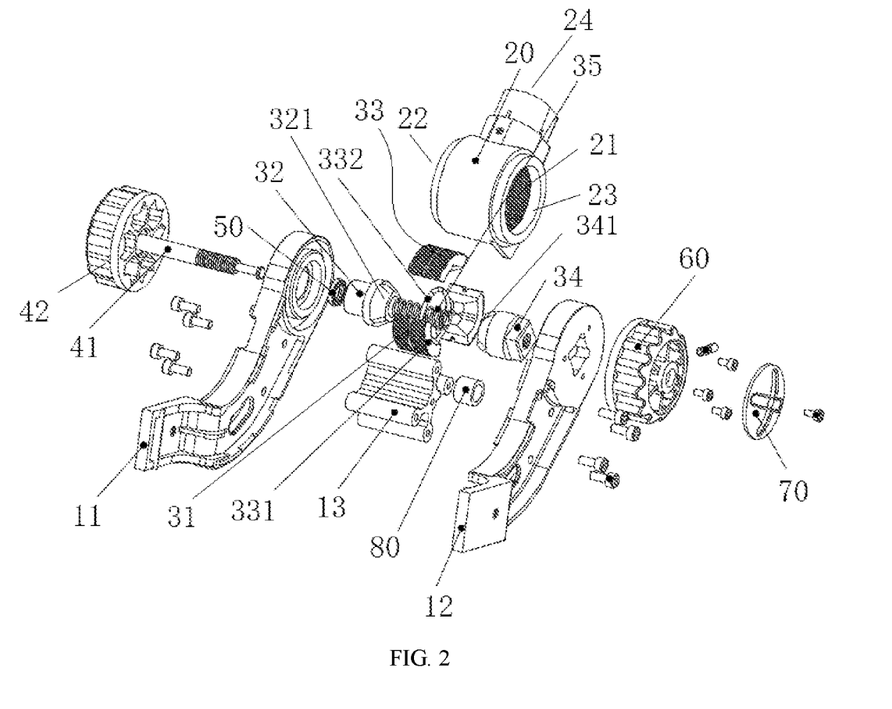
FIG. 2 shows an exploded view of a locking mechanism according to the first embodiment of the present disclosure.
Figure 3:
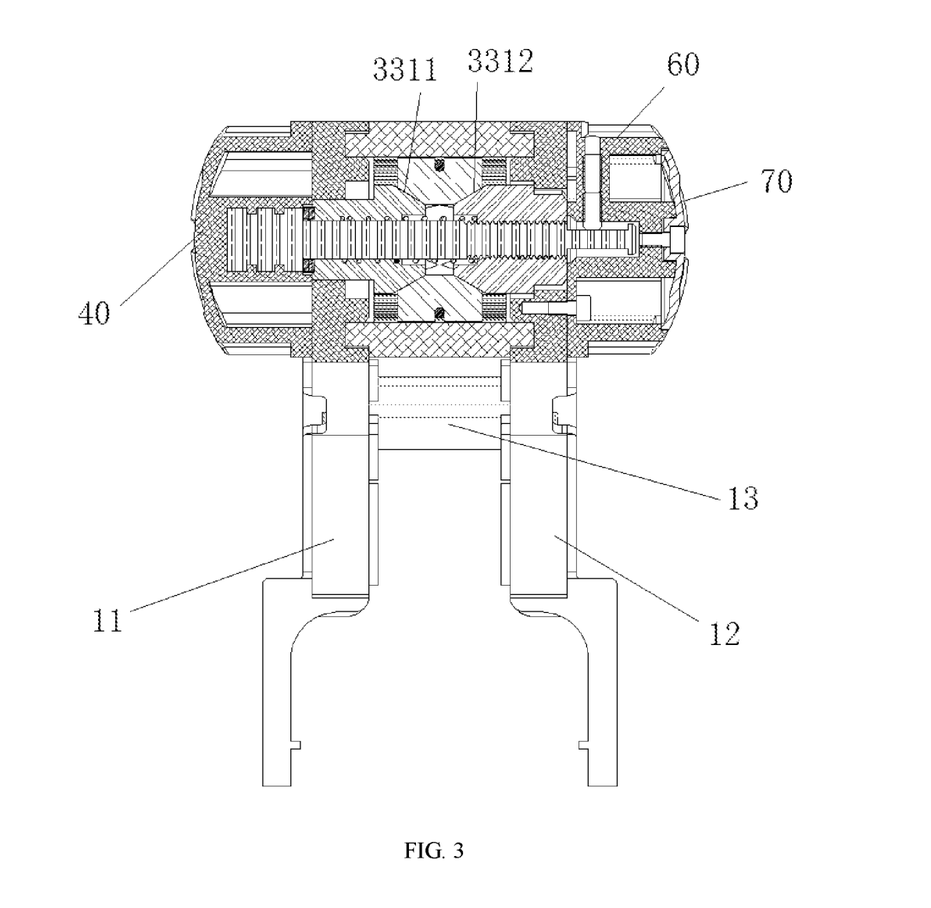
FIG. 3 shows a sectional view of a locking mechanism according to the first embodiment of the present disclosure.
Figure 4:
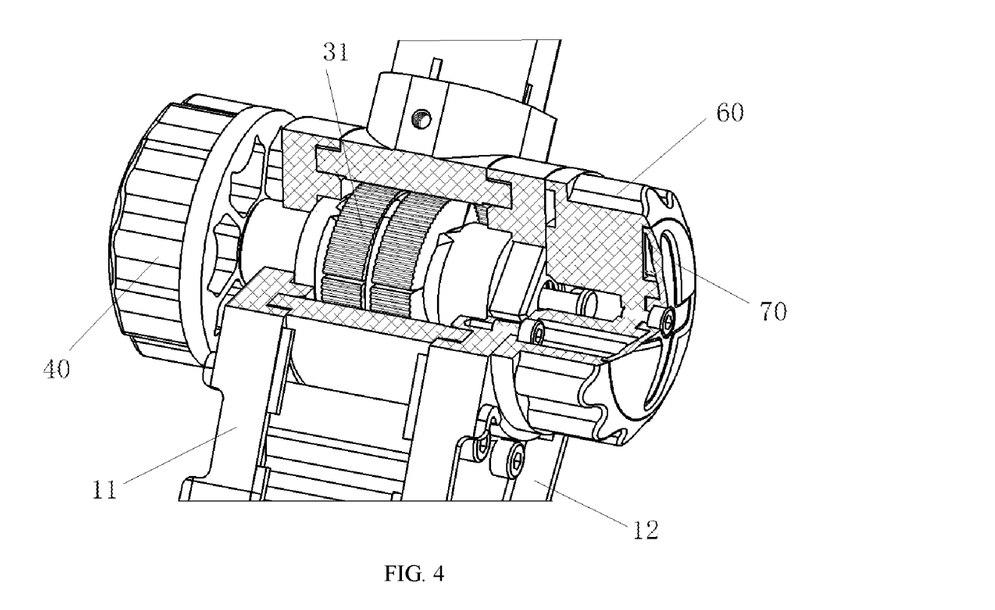
FIG. 4 shows a partial sectional view of a locking mechanism according to the first embodiment of the present disclosure.
Figure 5:
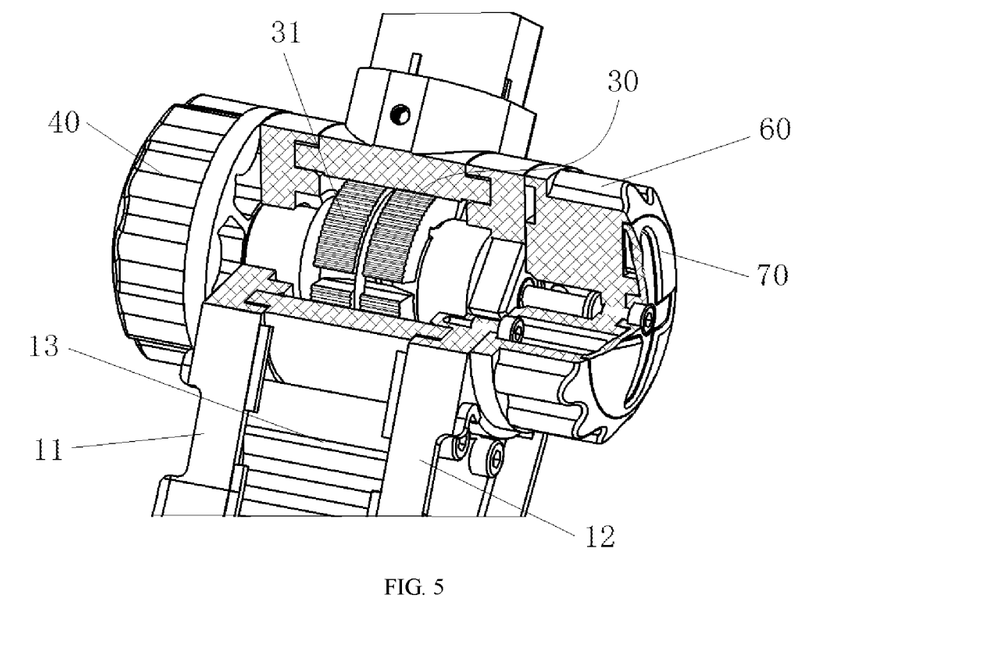
FIG. 5 is a schematic view illustrating a use state of a locking mechanism according to the first embodiment of the present disclosure.

As shown in FIGS. 1 to 5, a first embodiment of the present disclosure provides a locking mechanism that includes a mounting housing 10, a shaft sleeve 20, and a locking assembly 30. The shaft sleeve 20 is rotatably arranged on the mounting housing 10, and an inner wall of the shaft sleeve 20 is provided with a first snap structure 21. The locking assembly 30 is arranged on the mounting housing 10, and at least a part of the locking assembly 30 is movably arranged in the shaft sleeve 20. The locking assembly 30 has a locking position and an avoiding position, and the locking assembly 30 has a second snap structure 31 cooperating with the first snap structure 21. When the locking assembly 30 is in the locking position, the second snap structure 31 is snapped with the first snap structure 21 to limit the movement of the shaft sleeve 20; when the locking assembly 30 is in the avoiding position, the second snap structure 31 is spaced apart from the first snap structure 21 such that the shaft sleeve 20 is rotatably arranged on the mounting housing 10. Specifically, the first snap structure 21 in this embodiment may be a snap groove, the second snap structure 31 may be a snap protrusion, and the snap protrusion is snapped into the snap groove to restrict the rotation of the shaft sleeve 20.

By adopting the locking mechanism according to this embodiment, when the movement of the shaft sleeve 20 needs to be limited, the locking assembly 30 is in the locking position, so that the second snap structure 31 of the locking assembly 30 is snapped with the first snap structure 21 on the inner wall of the shaft sleeve 20, thereby effectively ensuring the stability of the position of the shaft sleeve 20 and avoiding the position shifting of the shaft sleeve 20. When the shaft sleeve 20 needs to be operated, the locking assembly 30 is in the avoiding position, so that the second snap structure 31 of the locking assembly 30 avoids the first snap structure 21 on the inner wall of the shaft sleeve 20, and then the shaft sleeve 20 is rotated. Therefore, the locking mechanism according to this the embodiment enables convenient operation and improves the ease of use for users.

In order to better drive the movement of the locking assembly 30, the locking mechanism in this embodiment further includes a driving member 40, and at least a part of the driving member 40 is movably arranged on and passes through the mounting housing 10. The driving member 40 is in driving connection with at least a part of the locking assembly 30 to drive the locking assembly 30 to move to the locking position or the avoiding position. With this arrangement, the locking assembly 30 can be driven simply by operating the driving member 40, in order to facilitate movement of the locking assembly 30 to the locking position or the avoiding position.

In this embodiment, the locking mechanism further includes an anti-loosening gasket 50, at least a part of the driving member 40 is movably arranged on and passes through the anti-loosening gasket 50, and the anti-loosening gasket 50 is positioned between the mounting housing 10 and the locking assembly 30. Specifically, the anti-loosening gasket 50 in this embodiment is a wedge-shaped anti-loosening gasket 50, which can solve the problem concerning the preload force provided by the user during barehanded rotation of the driving member 40, reduce the preload force of 17 KN required by conventional knobs to 2 KN, and ensure that the locking mechanism does not become loose due to vibration during use.

Specifically, the locking assembly 30 in this embodiment further includes a pushing block 32 movably disposed within the shaft sleeve 20 and a locking portion 33, and the driving member 40 drives the pushing block 32 to move in an axial direction. The locking portion 33 is arranged along a peripheral edge of the pushing block 32, and the second snap structure 31 is arranged on a side of the locking portion 33 away from the pushing block 32 to push the locking portion 33 to move in a radial direction by means of the pushing block 32, so that the second snap structure 31 avoids the first snap structure 21 or the second snap structure 31 is snapped with the first snap structure 21. Specifically, the driving member 40 in this embodiment is in driving connection with the pushing block 32, the driving member 40 is rotatably arranged, and the driving member 40 drives the pushing block 32 to move in the axial direction so that the locking portion 33 at the peripheral edge of the pushing block 32 expands or contracts in the radial direction by means of the pushing block 32, thereby making it convenient for the second snap structure 31 to be snapped with or avoid the first snap structure 21 on the inner wall of the shaft sleeve 20, which in turn facilitates control over the movement of the shaft sleeve 20. With this structural arrangement, the structural compactness can be improved, and the spatial layout of the whole structure can be optimized.

Specifically, the locking portion 33 in this embodiment includes a plurality of locking blocks 331 arranged along a peripheral direction of the pushing block 32, and the second snap structure 31 is arranged at a side of the locking blocks 331 away from the pushing block 32. With this arrangement, the pushing block 32 can conveniently push the plurality of locking blocks 331 to expand or contract in the radial direction, which in turn makes it convenient to control the movement position of the second snap structure 31 and thus the movement of the shaft sleeve 20, improve the structural compactness, and optimize the spatial layout of the whole structure. Specifically, the number of the locking blocks 331 may be three, and the three locking blocks 331 are arranged around the periphery of the pushing block 32.

In this embodiment, the pushing block 32 is provided with a first driving surface 321, the locking block 331 is provided with a second driving surface 3311 cooperating with the first driving surface 321, and the first driving surface 321 abuts against the second driving surface 3311 so that the pushing block 32 can push the locking block 331 to move. Specifically, the first driving surface 321 may be a first tapered surface, the second driving surfaces 3311 of the plurality of locking blocks 331 are spliced to form a second tapered surface, and the pushing block 32 drives the locking blocks 331 to move under the cooperation of the first tapered surface and the second tapered surface, which can improve the stability of the movement. Alternatively, the first driving surface 321 may further include a plurality of first inclined surfaces, the second driving surface 3311 may be configured as a second inclined surface adapted to the first inclined surface, and the pushing block 32 drives the locking blocks 331 to move under the cooperation of the first inclined surfaces and the second inclined surfaces.

Specifically, the locking portion 33 in this embodiment further includes an elastic ring 332 arranged on the plurality of locking blocks 331 to connect the plurality of locking blocks 331 by the elastic ring 332. With this arrangement, the integrity of the locking portion 33 can be ensured, the movement of the plurality of locking blocks 331 can be limited by the elastic ring 332, random movement among the plurality of locking blocks 331 can be avoided, and the stability when the plurality of locking blocks 331 move can be better ensured. At the same time, the plurality of locking blocks 331 can be reset by the elastic ring 332, so that the plurality of locking blocks 331 can be restored to a position where the second snap structure 31 avoids the first snap structure 21.

Specifically, the locking block 331 in the embodiment provided with a snap slot, and the elastic ring 332 is snapped in the snap slot, so that the stability of the elastic ring 332 arranged in the snap groove can be improved. Specifically, respective outer sides of the plurality of locking blocks 331 are provided with the snap slots extending peripherally, so that the elastic ring 332 is arranged in the snap slots. With this arrangement, the overall stability of the locking portion 33 can be better ensured, and the stability of the plurality of locking blocks 331 during movement can also be ensured, to facilitate the stable movement of the locking assembly 30 to the locking position or the avoiding position.

In one embodiment, the mounting housing 10 is provided with a first limiting portion, the pushing block 32 is provided with a second limiting portion, and the first limiting portion cooperates with the second limiting portion to limit the pushing block 32 from rotating. The locking block 331 is provided with a first limiting structure, the pushing block 32 is provided with a second limiting structure, and the first limiting structure cooperates with the second limiting structure to limit the movement of the locking block 331. Specifically, the first limiting portion may be a limiting mounting slot, and correspondingly, the second limiting portion may be a limiting bump, the limiting bump being in sliding fit with the limiting mounting slot along the axial direction; alternatively, the first limiting portion may be a limiting bump, and correspondingly, the second limiting portion may be a limiting mounting slot, the limiting bump being in sliding fit with the limiting mounting slot along the axial direction. Specifically, the first limiting structure may be a limiting groove, and correspondingly, the second limiting structure may be a limiting protrusion, the limiting groove being in sliding fit with the limiting protrusion for guidance; alternatively, the first limiting structure may be a limiting protrusion, and correspondingly, the second limiting structure may be a limiting groove, the limiting groove being in sliding fit with the limiting protrusion for guidance. With this structural arrangement, the pushing block 32 can be limited from rotating by the cooperation of the first limiting portion and the second limiting portion, and the movement of the locking block 331 can be guided by the cooperation of the first limiting structure and the second limiting structure, so that the locking block 331 can move to a position of avoiding the shaft sleeve 20 or a position of locking the shaft sleeve 20. The pushing block 32 here cannot only play a pushing role, but also play a guiding role for the locking block 331.

In another embodiment, the locking assembly 30 further includes a guide block 34 and a first limiting structure. The guide block 34 is arranged on the mounting housing 10 and spaced apart from the pushing block 32, and a plurality of locking blocks 331 are arranged along a peripheral direction of the guide block 34. Specifically, the guide block 34 is provided with a first guide surface 341, and the locking block 331 is provided with a second guide surface 3312 cooperating with the first guide surface 341. The first guide surface 341 abuts against the second guide surface 3312 to guide the plurality of locking blocks 331 by the guide block 34. Specifically, the first guide surface 341 is a third tapered surface, respective second guide surfaces 3312 of the plurality of locking blocks 331 are spliced into a fourth tapered surface, and under the cooperation of the third tapered surface and the fourth tapered surface, the locking blocks 331 move in a preset radial direction under the guidance of the guide block 34, so that the stability of the movement of the plurality of locking blocks 331 can be better guaranteed. Alternatively, the first guide surface 341 includes a plurality of third inclined surfaces, the second guide surface 3312 is a fourth inclined surface adapted to the third inclined surface, and under the cooperation of the third inclined surfaces and the fourth inclined surfaces, the guide block 34 guides the movement of the locking blocks 331. A first limiting portion is arranged on the mounting housing 10, a second limiting portion is arranged on the pushing block 32 and/or the guide block 34, and the first limiting portion cooperates with the second limiting portion to limit the pushing block 32 and/or the guide block 34 from rotating. The first limiting structure is arranged on the locking block 331, and the locking mechanism further includes a second limiting structure cooperating with the first limiting structure; the second limiting structure is arranged on the pushing block 32 and/or the guide block 34 to limit the movement of the locking block 331. With this structural arrangement, the radial expansion or contraction movement of the locking block 331 can be better guided, meanwhile, the position shifting of the second snap structure 31 caused by the position shifting of the locking blocks 331 can be avoided, and the phenomenon that the second snap structure 31 and the first snap structure 21 cannot be effectively snapped is avoided, further improving the stability of snapping.

Specifically, the first guide surface 341 can be arranged only on the guide block 34, and at least a part of the locking block 331 abuts against the first guide surface 341 to guide the movement of the locking block 331 in the preset radial direction by the first guide surface 341. Alternatively, the second guide surface 3312 can be arranged only on the locking block 331, and at least a part of the guide block 34 abuts against the second guide surface 3312 to move the locking block 331 in the preset radial direction by the second guide surface 3312.

Specifically, the first limiting portion includes a limiting mounting slot, the second limiting portion is a limiting bump, and the limiting bump is in sliding fit with the limiting mounting slot along an axial direction (the axial direction here referring to an axial direction of the shaft sleeve 20). The first limiting structure includes a limiting groove, the second limiting structure includes a limiting protrusion, and the limiting protrusion is in sliding fit with the limiting groove to guide the movement of the locking block 331.

Specifically, the first limiting portion includes a first limiting mounting slot, the second limiting portion includes a first limiting bump, and the first limiting bump is arranged on the guide block 34. The first limiting bump cooperates with the first limiting mounting slot to limit the guide block 34 from rotating. Specifically, the mounting housing 10 includes a first mounting plate 11 and a second mounting plate 12 which are oppositely disposed. The first mounting plate 11 and the second mounting plate 12 are located at both sides of the shaft sleeve 20. The first limiting mounting slot is arranged in the second mounting plate 12, and the first limiting bump is arranged at an end of the guide block 34 close to the second mounting plate 12. In order to better limit the rotation of the guide block 34, the first limiting mounting slot may have a polygonal slot structure (which may have a quadrangular slot structure or other polygonal slot structure), and accordingly, the first limiting bump may have a polygonal prism structure (which may have a quadrangular prism structure or other polygonal prism structure).

Specifically, the first limiting portion includes a second limiting mounting slot, the second limiting portion includes a second limiting bump, and the second limiting bump is arranged on the pushing block 32. The second limiting bump cooperates with the second limiting mounting slot to limit the pushing block 32 from rotating. Specifically, the second limiting mounting slot is arranged on the first mounting plate 11, and the second limiting protrusion is arranged on one side of the pushing block 32 close to the first mounting plate 11. In order to better limit the rotation of the pushing block 32, the second limiting mounting slot may have a polygonal slot structure (which may have a quadrangular slot structure), and accordingly, the second limiting bump may have a polygonal prism structure (which may have a quadrangular prism structure).

In this embodiment, in order to better play a guiding role, the first limiting portion includes the first limiting mounting slot and the second limiting mounting slot, and the second limiting portion includes the first limiting bump and the second limiting bump. By adopting this structure, the rotation of the guide block 34 can be limited through the fit between the first limiting mounting slot and the first limiting bump, and the rotation of the pushing block 32 can be limited through the fit between the second limiting mounting slot and the second limiting bump.

Specifically, the first limiting structure can include a first limiting groove, and the first limiting groove is arranged on one side of the locking block 331 close to the guide block; the second limiting structure includes a first limiting protrusion (which may be a directional prismatic structure), and the first limiting protrusion is arranged on the guide block 34. Specifically, the guide block 34 can be provided with a plurality of first limiting protrusions spaced apart from one another. Through the fit between the first limiting groove and the first limiting protrusions, the movement of the locking block 331 can be limited, so that the locking block 331 can expand or contract radially according to a preset direction, and the misalignment between the second snap structure 31 and the first snap structure 21 during locking can be avoided.

Specifically, the first limiting structure can also include a second limiting groove, and the second limiting groove is arranged on one side of the locking block 331 close to the pushing block 32; the second limiting structure includes a second limiting protrusion (which may be a directional prismatic structure), and the second limiting protrusion is arranged on the pushing block 32. Specifically, the pushing block 32 can be provided with a plurality of second limiting protrusion spaced apart from one another. Through the fit between the second limiting groove and the second limiting protrusions, the locking block 331 can be limited to radially expand or contract along the preset direction, and the misalignment between the second snap structure 31 and the first snap structure 21 during locking can be avoided.

In this embodiment, in order to better limit the movement direction and position of the locking block 331, the first limiting structure in this embodiment includes the first limiting groove and the second limiting groove, and the first limiting groove is spaced apart from the second limiting groove. With this arrangement, through the fit between the first limiting groove and the first limiting protrusion, and the fit between the second limiting groove and the second limiting protrusion, in combination with a limiting effect of the elastic ring 332, the movement of the locking block 331 can be better limited, so that the locking block 331 can smoothly and stably move to the locking position or the avoiding position.

The locking assembly 30 in this embodiment further includes an elastic element 35 having a first end configured to abut against the pushing block 32 and a second end configured to abut against the guide block 34, to provide a preload force of the elastic element 35. Specifically, the elastic element 35 is a spring, and at least a part of the driving member 40 passes through the spring.

In this embodiment, the locking mechanism further includes a driving member 40 that includes a driving rod 41, and the driving rod 41 is rotatably arranged on and passes through the mounting housing 10. The driving rod 41 is in driving connection with the pushing block 32, and the driving rod 41 is movably arranged on and passes through the guide block 34, so that the driving rod 41 pushes the plurality of locking blocks 331 to move by means of the pushing block 32. With this arrangement, the movement of the locking blocks 331 can be better driven, and the driving stability can be improved.

Specifically, the driving member 40 in this embodiment further includes a driving knob 42 coupled to the driving rod 41, and the driving knob 42 is located outside the mounting housing 10, so that the driving rod 41 is driven to rotate by operating the driving knob 42. With this arrangement, the user can drive the driving rod 41 to rotate simply by rotating the driving knob 42, and the driving rod 41 can move along an extension direction of the driving rod 41, so that the pushing block 32 is driven by the driving rod 41 to push the plurality of locking blocks 331 to move, or the plurality of locking blocks 331 are reset under the action of the elastic ring 332, which can facilitate control over the position of the second snap structure 31 and thus control over the movement of the shaft sleeve 20.

In this embodiment, the driving rod 41 is provided with an external thread, and the guide block 34 is provided with an internal thread cooperating with the external thread, so that the driving rod 41 is movably arranged on and passes through the guide block 34. With this arrangement, by rotating the driving knob 42, the driving rod 41 can be moved on the guide block 34, to facilitate the movement of the pushing block 32 by the driving rod 41, so as to drive the plurality of locking blocks 331 to move under the action of the pushing block 32.

Specifically, the shaft sleeve 20 in this embodiment has a first connection opening 22 and a second connection opening 23 that are oppositely disposed. The mounting housing 10 includes a first mounting plate 11 arranged at the first connection opening 22, and a second mounting plate 12. The second mounting plate 12 is spaced apart from the first mounting plate 11, the second mounting plate 12 is arranged at the second connection opening 23, and the shaft sleeve 20 is rotatably arranged on the first mounting plate 11 and the second mounting plate 12. With this arrangement, it is convenient to better rotatably arrange the shaft sleeve 20 on the mounting housing 10. The locking mechanism in this embodiment is mainly used in scooters. Specifically, the shaft sleeve 20 also has a third connection opening 24 between the first connection opening 22 and the second connection opening 23, and the third connection opening 24 is used to couple a vertical tube of the scooter.

In order to improve the mounting stability of the mounting housing 10, the mounting housing 10 in this embodiment further includes a connecting block 13 arranged between the first mounting plate 11 and the second mounting plate 12, to connect the first mounting plate 11 and the second mounting plate 12 through the connecting block 13, thereby improving the stability of the arrangement of the first mounting plate 11 and the second mounting plate 12. At the same time, it is possible to facilitate stable rotation of the shaft sleeve 20 on the mounting housing 10.

In this embodiment, the locking mechanism further includes a decoration button 60, a cover plate 70, and a rubber sleeve 80. The decoration button 60 is arranged at a side of the mounting housing 10 away from the driving button, to improve the aesthetics of the appearance. The cover plate 70 is arranged on the decoration button 60. The decoration button 60 is provided with a through hole, the driving rod 41 movably passes through the through hole, and the cover plate 70 covers the through hole to prevent the driving rod 41 from extending out of the through hole, which can avoid a situation that the driving rod 41 falls out due to too many rotation turns of the driving knob 42. The rubber sleeve 80 is fitted over at least a part of the connecting block 13. The first mounting plate 11 is coupled to the connecting block 13 by screws, and the second mounting plate 12 is coupled to the connecting block 13 by screws. Specifically, the connecting block 13 has an X-shaped structure with threaded holes at four ends of the X-shaped structure, and one or more columnar structures may be arranged on the X-shaped structure and configured to place the rubber sleeve 80. Specifically, in this embodiment, one columnar structure is milled at a threaded hole on an upper right side of the X-shaped structure; the rubber sleeve 80 is fitted over the columnar structure; the screw passes through a through hole in the first mounting plate 11 and then is connected with the corresponding threaded hole; meanwhile, the rubber sleeve 80 will be squeezed and undergo certain elastic deformation. By arranging the rubber sleeve 80, the risk of loosening after long-term use can be reduced, and the stability of the whole structure can be improved.

In this embodiment, the second mounting plate 12 is provided with a mounting hole, and the guide block 34 is pressed in the mounting hole in an interference manner.

By adopting the locking mechanism according to this embodiment, in a locking mode of rotary expansion, the locking action or the unlocking action can be satisfied simply by rotating the driving knob 42 by two turns, and the design of retaining structure can effectively prevent the knob from coming out, and upgrade the user experience during operation.

A second embodiment of the present disclosure provides a vehicle including the above locking mechanism. The vehicle may be a scooter, a bicycle, and etc. In specific implementation, the vehicle includes a vehicle body, a locking mechanism, and a vertical tube; the mounting housing 10 of the locking mechanism is arranged on the vehicle body; and the vertical tube is arranged on the shaft sleeve 20 of the locking mechanism. The vertical tube and the vehicle body can be simply and reliably locked by adjusting the locking mechanism.

It can be seen from the above description that the above embodiments of the present disclosure achieve the following technical effects: the ease of manipulation of the locking mechanism is improved, the anti-loosening effect is effectively achieved, the user experience is upgraded, and the operation stability of the whole structure is enhanced.

It is noted that the terms used herein are merely for the purpose of describing specific embodiments and are not intended to limit the exemplary embodiments according to the present disclosure. As used herein, the singular form is intended to include the plural form unless clearly specified otherwise. In addition, it is to be understood that the terms "including" and/or "comprising", when used in this specification, indicate the presence of features, steps, operations, devices, assemblies, and/or combinations thereof.

The relative arrangement of components and steps, numerical expressions, and numerical values set forth in these embodiments do not limit the scope of the present disclosure, unless otherwise specified. Also, it is to be understood that the dimensions of various components illustrated in the drawings are not drawn in relation to actual scale, for ease of description. Techniques, methods and devices known to those of ordinary skill in the related art may not be discussed in detail, but should be considered as part of the granted specification in appropriate situations. In all examples shown and discussed herein, any particular value should be construed as merely examples only and not as limitation. Thus, other examples of illustrative embodiments may have different values. It should be noted that similar numbers and letters refer to similar items in the drawings, and thus, once an item is defined in one figure, no further discussion of it is required in subsequent figures.

In the description of the present disclosure, it is to be understood that terms such as "front," "rear," "upper," "lower," "left," "right," "transverse," "vertical," "perpendicular," "horizontal," "top," "bottom," and the like generally refer to the orientation or positional relationships as shown in the drawings under discussion, and these relative terms are for convenience and simplicity of description. In the absence of a statement to the contrary, these terms do not indicate or imply that the referenced device or element must have a particular orientation or be constructed and operated in a particular orientation, and hence shall not be construed as limiting the scope of the present disclosure. The terms "inner" and "outer" refer to the inside and outside relative to contours of the components per se.

For ease of description, spatially relative terms, such as "on," "above," "on an upper surface of," "upper" and the like, may be used herein to describe the spatial position of a device or feature in relation to other devices or features as shown in the drawings. It is to be understood that spatial terms are intended to encompass different orientations in use or operation other than those depicted in the drawings. For example, a device described as "on" or "above" other devices or constructions would be positioned "under" or "below" the other devices or constructions after the device in the drawings is inverted. Thus, the exemplary term "above" may include two orientations—"above" and "below". The device may also be positioned in other different ways (rotated 90 degrees or in other orientations), and the spatial description herein will be explained accordingly.

In addition, it is to be understood that terms "first," "second," and the like to define components and parts are merely used to facilitate differentiation among corresponding components and parts, unless otherwise stated. These terms have no special meaning and cannot be understood as limiting the protection scope of the present disclosure.

The above description only elaborates some embodiments of the present disclosure and is not intended to limit the present disclosure. For those skilled in the art, the present disclosure may have various modifications and changes. Any modification, equivalent replacement, improvement and the like made within the principle of the present disclosure should be included in the protection scope of the present disclosure.

What is claimed is:

1. A locking mechanism, comprising:
   a mounting housing;
   a shaft sleeve rotatably arranged on the mounting housing, an inner wall of the shaft sleeve being provided with a first snap structure;
   a locking assembly, at least a part of the locking assembly being movably arranged in the shaft sleeve, and the locking assembly having a second snap structure configured to cooperate with the first snap structure; and
   a driving member, at least a part of the driving member being movably arranged on and passing through the mounting housing, the driving member being in driving connection with at least a part of the locking assembly, and the driving member configured to drive the second snap structure to be snapped with or separated from the first snap structure,
   wherein the locking assembly further comprises:
   a pushing block movably arranged in the shaft sleeve, the driving member configured to drive the pushing block to move in an axial direction; and
   a locking portion arranged along a peripheral edge of the pushing block, the second snap structure being arranged on a side of the locking portion away from the pushing block, and the pushing block configured to push the locking portion to move in a radial direction,
   wherein the locking portion comprises a plurality of locking blocks arranged along a peripheral direction of the pushing block, and the second snap structure is arranged on a side of each locking block away from the pushing block,
   wherein the locking portion further comprises an elastic ring, respective outer sides of the plurality of locking blocks are provided with snap slots extending peripherally, and the elastic ring is arranged in the plurality of snap slots.

2. The locking mechanism according to claim 1, further comprising:
   an anti-loosening gasket, wherein at least a part of the driving member is movably arranged on and passes through the anti-loosening gasket, and the anti-loosening gasket is located between the mounting housing and the locking assembly.

3. The locking mechanism according to claim 1, wherein the pushing block is provided with a first driving surface, each locking block is provided with a second driving surface cooperating with the first driving surface, and the first driving surface abuts against the second driving surface to enable the pushing block to push the locking block to move.

4. The locking mechanism according to claim 3, wherein the first driving surface is a first tapered surface, and the second driving surfaces of the plurality of locking blocks are spliced into a second tapered surface.

5. The locking mechanism according to claim 3, wherein the first driving surface comprises a plurality of first inclined surfaces, and the second driving surfaces are second inclined surfaces cooperating with the first inclined surfaces.

6. The locking mechanism according to claim 1, wherein the mounting housing is provided with a first limiting portion, the pushing block is provided with a second limiting portion, and the first limiting portion cooperates with the second limiting portion to limit the pushing block from rotating; each locking block is provided with a first limiting structure, the pushing block is provided with a second limiting structure, and the first limiting structure cooperates with the second limiting structure to limit movement of the locking block.

7. The locking mechanism according to claim 6, wherein the first limiting portion comprises a limiting mounting slot, the second limiting portion is a limiting bump, and the limiting bump is in sliding fit with the limiting mounting slot.

8. The locking mechanism according to claim 6, wherein the first limiting structure comprises a limiting groove, the second limiting structure comprises a limiting protrusion, and the limiting protrusion is in sliding fit with the limiting groove.

9. The locking mechanism according to claim 1, wherein the locking assembly further comprises:
  a guide block arranged on the mounting housing and spaced apart from the pushing block, wherein the plurality of locking blocks are arranged along a peripheral direction of the guide block;
  the guide block is provided with a first guide surface, each locking block is provided with a second guide surface cooperating with the first guide surface, and the first guide surface abuts against the second guide surface to guide the plurality of locking blocks by the guide block; the mounting housing is provided with a first limiting portion, at least one of the pushing block and the guide block is provided with a second limiting portion, and the first limiting portion cooperates with the second limiting portion to limit the at least one of the pushing block and the guide block from rotating; and
  a first limiting structure arranged on each locking block, wherein the locking mechanism further comprises a second limiting structure configured to cooperate with the first limiting structure and arranged on at least one of the pushing block and the guide block to limit movement of the locking block.

10. The locking mechanism according to claim 9, wherein the driving member comprises a driving rod rotatably arranged on and passing through the mounting housing; the driving rod is configured to drive the pushing block to move, and the driving rod is movably arranged on and passes through the guide block.

11. The locking mechanism according to claim 10, wherein the driving member further comprises a driving knob coupled to the driving rod and located outside the mounting housing.

12. The locking mechanism according to claim 10, wherein the driving rod is provided with an external thread, and the guide block is provided with an internal thread cooperating with the external thread, to enable the driving rod to be movably arranged on and pass through the guide block.

13. The locking mechanism according to claim 9, wherein the first guide surface is a third tapered surface, and the second guide surfaces of the plurality of locking blocks are spliced into a fourth tapered surface.

14. The locking mechanism according to claim 9, wherein the first guide surface comprises a plurality of third inclined surfaces, and the second guide surfaces are fourth inclined surfaces cooperating with the third inclined surfaces.

15. The locking mechanism according to claim 1, wherein the shaft sleeve is provided with a first connection opening and a second connection opening that are oppositely arranged, and the mounting housing comprises:
  a first mounting plate arranged at the first connection opening; and
  a second mounting plate spaced apart from the first mounting plate and arranged at the second connection opening, the shaft sleeve being rotatably arranged on and passing through the first mounting plate and the second mounting plate.

16. The locking mechanism according to claim 15, wherein the mounting housing further comprises a connecting block arranged between the first mounting plate and the second mounting plate.

17. A vehicle, comprising a locking mechanism, wherein the locking mechanism comprises:
  a mounting housing;
  a shaft sleeve rotatably arranged on the mounting housing, an inner wall of the shaft sleeve being provided with a first snap structure;
  a locking assembly, at least a part of the locking assembly being movably arranged in the shaft sleeve, and the locking assembly having a locking position where a second snap structure of the locking assembly is snapped with the first snap structure and an avoiding position where the second snap structure is separated from the first snap structure; and
  a driving member, at least a part of the driving member being movably arranged on and passing through the mounting housing, the driving member being in driving connection with at least a part of the locking assembly, and the driving member configured to drive the second snap structure to be snapped with or separated from the first snap structure,
  wherein the locking assembly further comprises:
  a pushing block movably arranged in the shaft sleeve, the driving member configured to drive the pushing block to move in an axial direction; and
  a locking portion arranged along a peripheral edge of the pushing block, the second snap structure being arranged on a side of the locking portion away from the pushing block, and the pushing block configured to push the locking portion to move in a radial direction,
  wherein the locking portion comprises a plurality of locking blocks arranged along a peripheral direction of the pushing block, and the second snap structure is arranged on a side of each locking block away from the pushing block, wherein the locking portion further comprises an elastic ring, respective outer sides of the plurality of locking blocks are provided with snap slots extending peripherally, and the elastic ring is arranged in the plurality of snap slots.

18. A locking mechanism, comprising:
a mounting housing;
a shaft sleeve rotatably arranged on the mounting housing, an inner wall of the shaft sleeve being provided with a first snap structure;
a locking assembly, at least a part of the locking assembly being movably arranged in the shaft sleeve, and the locking assembly having a second snap structure configured to cooperate with the first snap structure; and
a driving member, at least a part of the driving member being movably arranged on and passing through the mounting housing, the driving member being in driving connection with at least a part of the locking assembly, and the driving member configured to drive the second snap structure to be snapped with or separated from the first snap structure,
wherein the locking assembly further comprises:
a pushing block movably arranged in the shaft sleeve, the driving member configured to drive the pushing block to move in an axial direction; and
a locking portion arranged along a peripheral edge of the pushing block, the second snap structure being arranged on a side of the locking portion away from the pushing block, and the pushing block configured to push the locking portion to move in a radial direction,
wherein the locking portion comprises a plurality of locking blocks arranged along a peripheral direction of the pushing block, and the second snap structure is arranged on a side of each locking block away from the pushing block,
wherein the locking assembly further comprises:
a guide block arranged on the mounting housing and spaced apart from the pushing block, wherein the plurality of locking blocks are arranged along a peripheral direction of the guide block;
the guide block is provided with a first guide surface, each locking block is provided with a second guide surface cooperating with the first guide surface, and the first guide surface abuts against the second guide surface to guide the plurality of locking blocks by the guide block; the mounting housing is provided with a first limiting portion, at least one of the pushing block and the guide block is provided with a second limiting portion, and the first limiting portion cooperates with the second limiting portion to limit the at least one of the pushing block and the guide block from rotating; and
a first limiting structure arranged on each locking block, wherein the locking mechanism further comprises a second limiting structure configured to cooperate with the first limiting structure and arranged on at least one of the pushing block and the guide block to limit movement of the locking block.

\* \* \* \* \*